(12) United States Patent
Rautschek et al.

(10) Patent No.: US 7,550,514 B2
(45) Date of Patent: *Jun. 23, 2009

(54) DEFOAMER COMPOSITIONS

(75) Inventors: Holger Rautschek, Nünchritz (DE);
Christian Herzig, Waging (DE);
Richard Becker, Burghausen (DE)

(73) Assignee: Wacker Chemie AG, Munich (DE)

( * ) Notice: Subject to any disclaimer, the term of this patent is extended or adjusted under 35 U.S.C. 154(b) by 644 days.

This patent is subject to a terminal disclaimer.

(21) Appl. No.: 11/176,617

(22) Filed: Jul. 7, 2005

(65) Prior Publication Data

US 2006/0020082 A1  Jan. 26, 2006

(30) Foreign Application Priority Data

Jul. 23, 2004   (DE) ................ 10 2004 035 709

(51) Int. Cl.
*B01D 19/04* (2006.01)
*C11D 10/02* (2006.01)

(52) U.S. Cl. .............. 516/124; 510/349; 510/466; 516/123

(58) Field of Classification Search .......... 516/123, 516/124

See application file for complete search history.

(56) References Cited

U.S. PATENT DOCUMENTS

| | | | |
|---|---|---|---|
| 2,632,736 | A | 3/1953 | Curtie et al. |
| 2,676,182 | A | 4/1954 | Daudt et al. |
| 4,145,308 | A | 3/1979 | Simoneau et al. |
| 4,584,125 | A | 4/1986 | Griswold et al. |
| 6,521,586 | B1 * | 2/2003 | Hoogland et al. ........... 510/466 |
| 2006/0160908 | A1 * | 7/2006 | Rautschek et al. .......... 516/123 |

FOREIGN PATENT DOCUMENTS

| | | |
|---|---|---|
| DE | 1 519 987 B2 | 4/1970 |
| DE | 1 769 940 A | 3/1972 |
| DE | 2 551 260 A1 | 5/1977 |
| DE | 29 25 722 | 2/1981 |
| EP | 0 121 210 | 10/1984 |
| EP | 0 273 448 A2 | 7/1988 |
| EP | 0 301 531 A2 | 2/1989 |
| EP | 0 434 060 A2 | 2/1991 |
| EP | 0 887 097 A1 | 12/1998 |
| EP | 0 927 733 A1 | 7/1999 |
| EP | 1 060 778 A1 | 12/2000 |
| EP | 1 075 864 A2 | 2/2001 |
| EP | 1 076 0731 A1 | 2/2001 |
| JP | 60173068 A | 9/1985 |
| JP | 200266205 A2 | 3/2002 |

OTHER PUBLICATIONS

Parsonage et al., "Silicate Sources of Polyorganosiloxane Materials: A Brief Review," Spec. Publ., R. Soc. Chem., 166, 1995, pp. 98-106.
Derwent Abstract corresponding to EP 0 301 531 A1, Jul. 28, 1988.
Derwent Abstract corresponding to EP 0 927 733 A1, Jul. 7, 1999.
Derwent Abstract corresponding to EP 1 076 073 A1, Feb. 14, 2001.
Derwent Abstract corresponding to EP 0 887 097 A1, Dec. 30, 1998.
Derwent Abstract corresponding to EP 1 060 778 A1, Dec. 20, 2000.
Derwent Abstract corresponding to DE 15 19 987 B2, Apr. 27, 1964.
Derwent Abstract corresponding to DE 1 769 940 A, Aug. 9, 1968.
Derwent Abstract corresponding to DE 2 551 260 A1, May 18, 1977.
Derwent Abstract corresponding to DE 2 925 722 A1, Feb. 5, 1981.
Derwent Abstract corresponding to JP 60173068 A, Sep. 6, 1985.

* cited by examiner

Primary Examiner—Timothy J. Kugel
(74) Attorney, Agent, or Firm—Brooks Kushman P.C.

(57) ABSTRACT

Compositions comprising
(A) an organosilicon compound of the formula $$R_a(R^1O)_b R^2_c SiO_{(4-a-b-c)/2} \quad (I)$$

in which
$R^2$ independently denotes a monovalent, SiC-bonded, optionally substituted, aliphatic cyclic or aliphatic branched hydrocarbon radical having at least 3 carbon atoms, R, and $R^1$ are hydrogen or hydrocarbon radicals, the sum $a+b+c \leq 3$, the organosilicon compound has at least one unit of the formula (I) with c other than 0, and in at least 50% of all of the units of the formula (I) in the organosilicon compound the sum $a+b+c$ is 2;
at least one additive (B) selected from
(B1) filler particles and/or
(B2) organopolysiloxane resin(s)
and optionally
(C) an organosilicon compound which has units of the formula (III), $$R^5_g(R^6O)_h SiO_{(4-g-h)/2}$$

where $R^5$ and $R^6$ are hydrogen or a hydrocarbon radical, $g+h \leq 3$ and in at least 50% of the units (III), $g+h=2$, are highly effective and long lasting defoamers.

23 Claims, No Drawings

DEFOAMER COMPOSITIONS

BACKGROUND OF THE INVENTION

1. Field of the Invention

The invention relates to compositions comprising organosilicon compounds having branched and/or cyclic, preferably saturated alkyl groups attached directly to silicon, and to their use as defoamers.

2. Description of the Related Art

In many liquid systems, especially aqueous systems which include surface-active compounds, sometimes as unwanted constituents, it is possible for foaming problems to occur if these systems are contacted, more or less intensively, with gaseous substances. Examples include the gassing (generally, aeration) of wastewaters, during the intensive agitation of liquids, during distillation, during washing or dyeing operations, or during dispensing processes, as but limited examples. The resulting foam can be controlled by mechanical means or through the addition of defoamers. Siloxane-based defoamers have proven particularly appropriate.

Siloxane-based defoamers may be prepared as disclosed by DE-B 15 19 987, by heating hydrophilic silica in polydimethylsiloxanes. Addition of basic catalysts during the treatment process allows the effectiveness of such defoamers to be improved, as disclosed in DE-A 17 69 940, for instance. An alternative is to disperse hydrophobicized silica in a polydimethylsiloxane, as disclosed, for example, in DE-A 29 25 722. Nevertheless, the effectiveness of the resulting defoamers is still in need of improvement. Thus, for example, U.S. Pat. No. 4,145,308 describes a defoamer preparation which in addition to a polydiorganosiloxane and silica, further comprises a copolymer made up of $(CH_3)_3SiO_{1/2}$ and $SiO_2$ units. Copolymers made up of $(CH_3)_3SiO_{1/2}$ and $SiO_2$ units are also said to be advantageous in combination with siloxanes which carry terminal long chain alkyl groups, as described, for example, in EP-A 301 531. The use of partly crosslinked polydimethylsiloxanes which are in some cases already rubberlike is said to contribute to increasing the defoamer effect. On this point, reference may be made, for example, to U.S. Pat. No. 2,632,736, EP-A 273 448 and EP-A 434 060. These products, however, though, are generally of very high viscosity and are difficult to handle or to process further.

Generally polysiloxanes having methyl groups, such as polydimethylsiloxanes, are used in defoamers. Although polymers with a range of other aliphatic or aromatic hydrocarbon groups on silicon are known and are also proposed in numerous patents for the preparation of defoamers, there are few indications that by selecting from among such substituents, it is possible to achieve a substantial improvement in the defoaming effect. Frequently, the aim of introducing long alkyl groups or polyether substituents is to improve the compatibility with mineral oils that may be present in defoamer compositions, or to prevent silicone defects in coatings, such as "fisheyes", for example. Thus EP-A 121 210 recommends the use of polysiloxanes which carry alkyl groups having 6-30 carbon atoms whereby the fraction of carbon in the form of the $CH_2$ group is 30%-70%, in combination with mineral oil. In the examples, mention is made in particular of polysiloxanes having octadecyl groups. JP-A 60173068 recommends siloxanes having octyl groups and polyether groups as defoamers in aqueous printing inks. Siloxanes having alkyl groups with more than 30 carbon atoms in combination with amino siloxanes are said by U.S. Pat. No. 4,584,125 to be advantageous for an antifoam effect, especially when the fraction of siloxane units carrying these moieties is around 5%.

In strongly foaming, surfactant-rich systems, however, the defoamer formulations prepared in accordance with the prior art do not always have a sufficiently long-lasting effectiveness or else, owing to high viscosity due to the degree of branching or crosslinking involved, are difficult to handle.

SUMMARY OF THE INVENTION

Superior defoamer compositions are prepared from a preferably ternary mixture of organosilicon compounds and silicone resin. The composition is particularly effective at high surfactant loadings in the surfactant-containing, aqueous composition.

DETAILED DESCRIPTION OF THE PREFERRED EMBODIMENT(S)

The invention thus provides compositions comprising
(A) at least one organosilicon compound comprising units of the formula

in which
R independently denote hydrogen or a monovalent, optionally substituted, SiC-bonded aromatic or linear aliphatic hydrocarbon radical,
$R^1$ independently denote hydrogen or a monovalent, optionally substituted hydrocarbon radical,
$R^2$ independently denote monovalent, SiC-bonded, optionally substituted, aliphatic, cyclic or aliphatic branched hydrocarbon radicals having at least 3 carbon atoms,
a is 0, 1, 2 or 3,
b is 0, 1, 2 or 3,
c is 0, 1 or 2
with the proviso that the sum $a+b+c \leq 3$, the organosilicon compound has at least one unit of the formula (I) with c other than 0, and in at least 50% of all of the units of the formula (I) in the organosilicon compound the sum $a+b+c$ is 2;
(B) at least one additive selected from
(B1) filler particles and/or
(B2) organopolysiloxane resin comprising units of the formula

in which
$R^3$ independently denote hydrogen or a monovalent, optionally substituted, SiC-bonded hydrocarbon radical,
$R^4$ independently denote hydrogen or a monovalent, optionally substituted hydrocarbon radical,
d is 0, 1, 2 or 3 and
e is 0, 1, 2 or 3,
with the proviso that the sum $d+e \leq 3$ and in less than 50% of all of the units of the formula (II) in the organopolysiloxane resin the sum $d+e$ is 2, and optionally
(C) an organosilicon compound comprising units of the formula

in which
$R^5$ independently denote hydrogen or a monovalent, optionally substituted, SiC-bonded aromatic or linear aliphatic hydrocarbon radical,
$R^6$ independently denote hydrogen or a monovalent, optionally substituted hydrocarbon radical,
g is 0, 1, 2 or 3 and h is 0, 1, 2 or 3, with the proviso that the sum g+h≦3 and in at least 50% of all of the units of the formula (IV) in the organosilicon compound the sum g+h is 2.

Examples of radicals $R^2$ are cycloaliphatic radicals such as the cyclobutyl, cyclopentyl, cyclohexyl, cycloheptyl, cyclooctyl, pinyl, norbornyl and 2-cyclohexylethyl radicals, and also branched aliphatic radicals such as the isopropyl, 2-n-butyl, isobutyl, tert-butyl, isopentyl, neopentyl, and tert-pentyl radicals, isooctyl radicals such as the 2,2,4-trimethyl-pentyl radical, and neohexyl radicals. Where $R^2$ comprises substituted cycloaliphatic or branched aliphatic radicals, which is not preferred, preferred substituents are halogen atoms, ether groups, ester groups and amino groups. Preferably radical $R^2$ comprises cycloaliphatic hydrocarbon radicals.

When radical $R^2$ is a cycloaliphatic hydrocarbon radical, preference is given to those having 3 to 18 carbon atoms, more preferably those having 5 to 10 carbon atoms, especially the cyclopentyl, cyclohexyl, norbornyl and cyclooctyl radicals, and if $R^2$ is a branched aliphatic hydrocarbon radical, preference is given to those having 3 to 18 carbon atoms, and particular preference is given to branched aliphatic hydrocarbon radicals having 5 to 10 carbon atoms.

With particular preference, radical $R^2$ is chosen such that the carbon atom attached to the silicon in the radical $R^2$ carries no hydrogen atom or not more than one hydrogen atom. In this case there may be units of the formula (I) having, for example, the following structures:

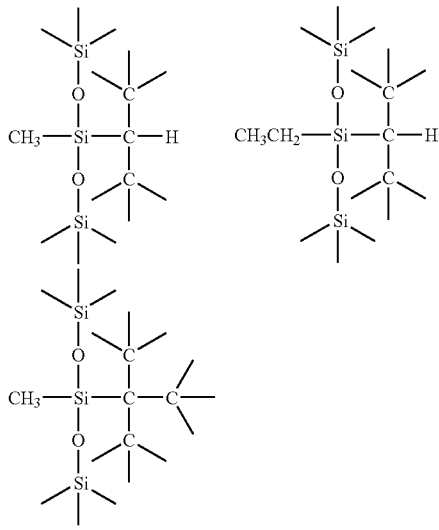

With particular preference 20% to 100%, in particular 50% to 100%, of all of the radicals $R^2$ in component (A) are radicals in which the carbon atom attached to silicon carries no hydrogen atom or not more than one hydrogen atom. Radical R may comprise all optionally substituted hydrocarbon radicals which do not come under the definition of radical $R^2$. Examples of radicals R are linear alkyl radicals such as the methyl, ethyl, n-propyl, n-butyl, n-pentyl, n-hexyl, n-hepty, n-octyl, n-nonyl, n-decyl, n-dodecyl, and n-octadecyl radicals; linear alkenyl radicals such as the vinyl and allyl radical; linear alkyne radicals; aryl radicals such as the phenyl, naphthyl, anthryl and phenanthryl radicals; alkaryl radicals such as the o-, m- and p-tolyl radicals, xylyl radicals, and ethylphenyl radicals; and aralkyl radicals such as the benzyl radical, and the α- and the β-phenylethyl radicals.

Examples of substituted radicals R are the 3,3,3-trifluoro-n-propyl, cyanoethyl, glycidyloxy-n-propyl, polyalkylene glycol-n-propyl, amino-n-propyl, aminoethylamino-n-propyl, and methacryloyloxy-n-propyl radicals, and the o-, m- and p-chlorophenyl radicals.

Preferably, radical R is a hydrogen atom or an optionally substituted, aromatic or linear aliphatic hydrocarbon radical having 1 to 30 carbon atoms, more preferably a hydrocarbon radical having 1 to 4 carbon atoms, and in particular the methyl radical.

Examples of radical $R^1$ are hydrogen and the radicals indicated for radical R and $R^2$. Preferably radical $R^1$ comprises hydrogen or an optionally substituted hydrocarbon radical having 1 to 30 carbon atoms, more preferably hydrogen or a hydrocarbon radical having 1 to 4 carbon atoms, especially the methyl and ethyl radicals.

Preferably b is 0 or 1, more preferably 0. Preferably c is 0 or 1.

The organosilicon compounds containing units of the formula (I) that are used as component (A) are preferably branched or linear organopolysiloxanes which more preferably are composed of units of the formula (I). In the context of the present invention the term "organopolysiloxanes" is intended to embrace polymeric, oligomeric and dimeric siloxanes. The fraction of the radicals $R^2$ in component (A) is preferably 5% to 100%, more preferably 10% to 60%, in particular 15% to 50%, based in each case on the total number of SiC-bonded radicals.

Preferably component (A) of the invention comprises substantially linear organopolysiloxanes of the formula

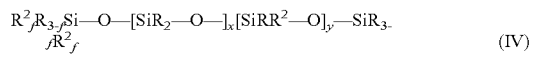

where R and $R^2$ are as defined therefor above, f can be identical or different and is 0 or 1, x is 0 or an integer, y is an integer greater than or equal to 1 and the x units [SiR$_2$—O] and the y units [SiRR$^2$—O] can be present as blocks or, distributed randomly in the molecule.

Although not indicated in formula (IV), these organopolysiloxanes can contain up to 10 mole percent, based on the sum of all of the siloxane units, of other siloxane units, such as ≡SiO$_{1/2}$, —SiO$_{3/2}$ and SiO$_{4/2}$ units.

Preferably less than 5 mol %, in particular less than 1 mol %, of the radicals R, based in each case on the sum of the radicals R and $R^2$ in formula (IV), are hydrogen atoms.

The sum of x and y determines the degree of polymerization of the polysiloxane (IV) and hence the viscosity. The sum of x and y is preferably in the range from 2 to 1000, more preferably in the range from 10 to 200. The ratio x/y is preferably in the range from 0 to 100, more preferably in the range from 0 to 20 and in particular in the range from 0 to 4.

Examples of the inventive component (A) are

Me$_3$Si—O—[SiMe$_2$—O—]$_{40}$—[SiMeCyP—O]$_{36}$—SiMe$_3$,
CyP—Me$_2$Si—O—[SiMe$_2$—O—]$_{14}$—[SiMeCyP—O]$_{17}$—SiMe$_2$—CyP,
Me$_3$Si—O—[SiMe$_2$—O—]$_{40}$—[SiMeCyX—O]$_{36}$—SiMe$_3$,
Me$_3$Si—O—[SiMe$_2$—O—]$_{86}$—[SiMeNB—O]$_{18}$—SiMe$_3$,
Me$_3$Si—O—[SiMe$_2$—O—]$_{15}$—[SiMeNB—O]$_{45}$—SiMe$_3$,
NB—Me$_2$Si—O—[SiMe$_2$—O—]$_{40}$—[SiMeNB—O]$_{36}$—SiMe$_2$—NB,
Me$_3$Si—O—[SiMe$_2$—O—]$_{20}$—[SiMeCyO—O]$_{20}$—SiMe$_3$,

Me$_3$Si—O—[SiMeHex-O—]$_{40}$—[SiMeCyP—O]$_{18}$—SiMe$_3$,
Me$_3$Si—O—[SiMeOct-O—]$_{75}$—[SiMeNB—O]$_{25}$—SiMe$_3$,
Me$_3$Si—O—[SiMeIOc-O—]$_{45}$—[SiMeCyH—O]$_{15}$—SiMe$_3$,
Me$_3$Si—O—[SiMeIOc-O—]$_{30}$—[SiMeDd-O]$_{30}$—SiMe$_3$,
Me$_3$Si—O—[SiMeNeoH—O—]$_{20}$—[SiMeDd-O]$_{35}$—SiMe$_3$,
Me$_3$Si—O—[SiMeHex-O—]$_{10}$—[SiMeCyP—O]$_{10}$—SiMe$_3$,
Me$_3$Si—O—[SiMeNeoH—O—]$_{10}$—[SiMeNB—O]$_{10}$—SiMe$_3$,
Me$_3$Si—O—[SiMeNeoH—O—]$_{50}$—SiMe$_3$,
Me$_3$Si—O—[SiMeIOc-O—]$_{80}$—[SiMeNB—O]$_{20}$—[SiMeH—O]$_2$—SiMe$_3$ and
Me$_3$Si—O—[SiMeOct-O—]$_{150}$—[SiMeNB—O]$_{20}$—SiMe$_3$, where Me is methyl radical, CyP is cyclopentyl, CyH is cyclohexyl, NB is norbornyl, oct is n-octyl, IOc is isooctyl, CyO is cyclooctyl, NeoH is neohexyl, Dd is dodecyl and Hex is n-hexyl.

The organosilicon compounds (A) of the invention preferably have a viscosity of 10 to 1,000,000 mPas, more preferably from 50 to 50,000 mPas, and in particular from 500 to 5,000 mPas, measured in each case at 25° C. The organosilicon compounds (A) can be prepared by any methods in organosilicon chemistry, such as, for example, by cohydrolysis of the corresponding silanes or, preferably, by hydrosilylation of the corresponding organosilicon compounds containing Si-bonded hydrogen. In the case of hydrosilylation, organosilicon compounds having Si-bonded hydrogen (1) are reacted with the corresponding aliphatically unsaturated compounds (2) in the presence of catalysts (3) which promote the addition reaction of Si-bonded hydrogen with aliphatic multiple bond (hydrosilylation).

The organosilicon compounds having Si-bonded hydrogen (1) that are used in accordance with the invention are preferably compounds containing units of the formula $$R_a(R^1O)_bH_cSiO_{(4-a-b-c)/2} \qquad (V)$$

where R, R$^1$, a, b and c are as defined therefor above.

Examples of compounds (2) having aliphatically unsaturated carbon-carbon multiple bonds which are useful in accordance with the invention, include 3,3-dimethylbut-1-ene (neohexene), 2,4,4-trimethylpent-1-ene(isooctene), cyclopentene, cyclohexene, cyclooctene, pinene and norbornene.

If compound (2) is used in a large excess or if a selective reaction is achieved by means of the reaction regime (in order to prevent gelling, for example) it is also possible to use difunctional olefins, such as vinylcyclohexene, limonene or dicyclopentadiene, to prepare organosilicon compounds having branched and/or cyclic aliphatic hydrocarbon radicals.

It is also possible to use mixtures of different compounds (2) and to use unbranched aliphatic or aromatic olefins as well, which then lead, for example, to the above-described radicals R. Examples of such olefins which can be optionally used as well are ethylene, propylene, 1-hexene, 1-octene, styrene, α-methylstyrene, dodecene and hexadecene.

The hydrosilylation catalysts (3) which can be used for preparing component (A) can be any catalyst which is useful for hydrosilylation. Preferably such catalysts comprise a metal from the group of the platinum metals, or a compound or a complex from the group of the platinum metals. Examples of such catalysts (3) are metallic and finely divided platinum, which may be on a support such as silica, alumina or activated carbon, compounds or complexes of platinum, such as platinum halides, e.g., PtCl$_4$, H$_2$PtCl$_6$.6H$_2$O, Na$_2$PtCl$_4$.4H$_2$O, platinum-olefin complexes, platinum-alcohol complexes, platinum-alkoxide complexes, platinum-ether complexes, platinum-aldehyde complexes, platinum ketone complexes, including reaction products of H$_2$PtCl$_6$.6H$_2$O and cyclohexanone, platinum-vinylsiloxane complexes, such as platinum-1,3-divinyl-1,1,3,3-tetramethyldisiloxane complexes with or without detectable inorganically bonded halogen, bis(gamma-picoline)platinum dichloride, trimethylenedipyridineplatinum dichloride, dicyclopentadieneplatinum dichloride, dimethyl sulfoxide-ethyleneplatinum(II) dichloride, cyclooctadiene-platinum dichloride, norbornadiene-platinum dichloride, γ-picoline-platinum dichloride, cyclopentadiene-platinum dichloride, and reaction products of platinum tetrachloride with olefin and primary amine or secondary amine or with primary and secondary amine, such as the reaction product of platinum tetrachloride in solution in 1-octene with sec-butylamine, or ammonium-platinum complexes.

The catalyst (3) is used preferably in amounts of 0.2 to 200 ppm by weight (parts by weight per million parts by weight), more preferably in amounts of 1 to 50 ppm by weight, calculated in each case as elemental platinum and based on the total weight of compound (1) and compound (2).

The reaction is carried out preferably at a temperature of 20 to 150° C., more preferably 40 to 100° C., and preferably under the pressure of the surrounding atmosphere, i.e., approximately at 900 to 1100 hPa.

Since compounds (2) may have a tendency to undergo polymerization at relatively high temperatures, it is possible and preferable in the first step of the process to use free-radical inhibitors such as 4-methoxyphenol, phenothiazine, 2,6-bis(tert-butyl)-4-methylphenol, hydroquinone or pyrocatechol. If free-radical inhibitors are used, the amounts involved are preferably 10 to 500 ppm by weight, based on the total weight of compound (1) and compound (2).

For the reaction of compound (1) with compound (2) it is possible to use inert organic solvents as well. Examples of inert organic solvents are toluene, xylene, octane isomers, heptane isomers, butyl acetate, 1,2-dimethoxyethane, tetrahydrofuran and cyclohexane. The solvent can be removed, after the reaction, if desired, by distillation, together with excess compound (2).

The compositions of the invention preferably comprise additive (B) in amounts of preferably 0.1 to 30 parts by weight, more preferably 1 to 15 parts by weight, based in each case on 100 parts by weight of component (A).

Additive (B) employed in accordance with the invention may comprise exclusively component (B1), exclusively component (B2) (both as defined below) or a mixture of components (B1) and (B2), the latter being preferred.

Component (B1) preferably comprises a pulverulent filler, more preferably a pulverulent hydrophobic filler. Preferably component (B1) has a BET surface area of 20 to 1000 m$^2$/g, a particle size of less than 10 μm and an agglomerate size of less than 100 μm. Examples of component (B1) are, for example, silicon dioxide (silicas), titanium dioxide, aluminum oxide, metal soaps, quartz flour, PTFE powders, fatty acid amides, ethylenebisstearamide and finely divided hydrophobic polyurethanes. As component (B1) it is preferred to use silicon dioxide (silicas), titanium dioxide or aluminum oxide having a BET surface area of 20 to 1000 m$^2$/g, a particle size of less than 10 μm and an agglomerate size of less than 100 μm. Of particular preference as component (B1) are silicas, particularly those having a BET surface area of 50 to 800 m$^2$/g. These silicas may be pyrogenic or precipitated silicas. As component (B1) it is possible to use both pretreated silicas, i.e., commercially customary hydrophobic silicas, and hydrophilic silicas.

Examples of hydrophobic silicas which can be used in accordance with the invention are HDK® H2000, a pyrogenic, hexamethyldisilazane-treated silica having a BET surface area of 140 m²/g (available commercially from Wacker-Chemie GmbH, Germany) and a precipitated, polydimethylsiloxane-treated silica having a BET surface area of 90 m²/g (available commercially under the name "Sipernat® D10" from Degussa AG, Germany). If hydrophobic silicas are to be used as component (B1), it is also possible to hydrophobicize hydrophilic silicas in situ, if to do so is advantageous for the desired effectiveness of the defoamer formulation. There are many known methods of hydrophobicizing silicas. The hydrophilic silica can be hydrophobicized in situ by, for example, heating the silica in dispersion in component (A) or in a mixture of (A) with (B2) and/or (C) at temperatures of 100 to 200° C. for a number of hours. This reaction can be assisted by the addition of catalysts, such as KOH, and of hydrophobicizers, such as short-chain OH-terminated polydimethylsiloxanes, silanes or silazanes. This treatment is also possible when using commercially customary hydrophobic silicas, and may contribute to improved effectiveness. Another possibility is to use a combination of silicas hydrophobicized in situ with commercially available hydrophobic silicas.

Compound (B2) is an organopolysiloxane resin comprising units of the formula (II):

$$R^3_d(R^4O)_e SiO_{(4-d-e)2} \quad (II)$$

Examples of radical $R^3$ are hydrogen atom and the radicals indicated for radical R and $R^2$. Preferably, $R^3$ comprises optionally substituted hydrocarbon radicals having 1 to 30 carbon atoms, more preferably hydrocarbon radicals having 1 to 6 carbon atoms, and in particular the methyl radical.

Examples of radical $R^4$ are the radicals indicated for the radical $R^1$. Radical $R^4$ preferably comprises hydrogen or hydrocarbon radicals having 1 to 4 carbon atoms, particularly, hydrogen, methyl radicals, or ethyl radicals. Preferably the value of d is 3 or 0.

Optional component (B2) preferably comprises silicone resins made up of units of the formula (II) for which in less than 30%, preferably in less than 5%, of the units in the resin, the sum d+e is 2. With particular preference component (B2) comprises organopolysiloxane resins composed essentially of $R^3_3SiO_{1/2}$ (M) and $SiO_{4/2}$ (Q) units with $R^3$ as defined previously; these resins are also called "MQ" resins. The molar ratio of M to Q units is preferably in the range from 0.5 to 2.0, more preferably in the range from 0.6 to 1.0. These silicone resins may additionally contain up to 10% by weight of free hydroxyl or alkoxy groups. Preferably these organopolysiloxane resins (B2) have a viscosity at 25° C. of more than 1000 mPas or are solids. The weight-average molecular weight determined by gel permeation chromatography (relative to a polystyrene standard) of these resins is preferably 200 to 200,000 g/mol, in particular 1000 to 20,000 g/mol.

Component (B2) may be a commercially available product, or can be prepared by silicon chemistry, in accordance for example with Parsonage, J. R.; Kendrick, D. A. (Science of Materials and Polymers Group, University of Greenwich, London, UK SE18 6PF) SPEC. PUBL.—R. SOC. CHEM. 166, 98-106, 1995, U.S. Pat. No. 2,676,182 or published application EP-A 927 733.

Where additive (B) used in accordance with the invention comprises a mixture of components (B1) and (B2), the weight ratio of (B1) to (B2) in the mixture is preferably 0.01 to 50, more preferably 0.1 to 7.

Organosilicon compound (C) is an optional component, in which examples of radicals $R^5$ are the examples indicated for radical R. Preferably radical $R^5$ comprises hydrogen atom or optionally substituted, aromatic or linear aliphatic hydrocarbon radicals having 1 to 30 carbon atoms, more preferably hydrocarbon radicals having 1 to 4 carbon atoms, and especially the methyl radical.

Examples of radical $R^6$ are hydrogen and the radicals indicated for radical R and $R^2$. Preferably, radical $R^6$ comprises hydrogen or optionally substituted hydrocarbon radicals having 1 to 30 carbon atoms, more preferably hydrogen or hydrocarbon radicals having 1 to 4 carbon atoms, and especially methyl radicals and ethyl radicals. The value of g is preferably 1, 2 or 3. The value of h is preferably 0 or 1.

The optional organopolysiloxanes (C) preferably have a viscosity of 10 to 1,000,000 mm²/s at 25° C. Examples of component (C), are the examples indicated for component (A), this organo silicon compound, however, containing no branched and/or cyclic radicals $R^2$ attached directly to silicon. Examples included polydimethylsiloxanes having viscosities of 100 to 1,000,000 mPa·s at 25° C. These polydimethylsiloxanes may be branched as a result, for example, of the incorporation of $R^5SiO_{3/2}$ or $SiO_{4/2}$ units up to a maximum of 5% of all the units. These branched or partly crosslinked siloxanes then have viscoelastic properties. Component (C), preferably comprises essentially linear organopolysiloxanes containing units of the formula (III), more preferably polydimethylsiloxanes, which may be terminated with silanol groups and/or with alkoxy groups and/or with trimethylsiloxy groups, or siloxanes containing polyether groups. Polyether-modified polysiloxanes of the latter type are known and are described for example in EP-A 1076073. With particular preference, component (C) comprises organosilicon compounds containing units of the general formula (III) in which $R^5$ is a methyl radical and $R^6$ is a linear and/or branched hydrocarbon radical having at least 6 carbon atoms, h adopts an average value of 0.005 to 0.5 and the sum (g+h) has an average value of 1.9 to 2.1. Products of this kind are obtainable, for example, by alkali-catalyzed condensation of silanol-terminated polydimethylsiloxanes with a viscosity of 50 to 50,000 mPa·s at 25° C., with aliphatic alcohols having more than 6 carbon atoms, such as isotridecyl alcohol, n-octanol, stearyl alcohol, 4-ethylhexadecanol or eicosanol.

If the compositions of the invention include component (C), the amounts involved are preferably 1 to 900 parts by weight, more preferably 2 to 100 parts by weight, in particular 2 to 10 parts by weight, based in each case on 100 parts by weight of component (A). Component (C) may be a commercially available products or may be prepared by methods of silicon chemistry.

In addition to components (A), (B) and, where used, (C), the compositions of the invention may comprise further substances useful in defoamer formulations, for example, water-insoluble organic compounds (D). The term "water-insoluble" is intended to be understood for the purposes of the present invention as meaning a solubility in water at 25° C. under a pressure of 1013.25 hPa of not more than 2 percent by weight.

Component (D), used optionally, preferably comprises water-insoluble organic compounds having a boiling point greater than 100° C. under the pressure of the surrounding atmosphere, i.e., under 900 to 1100 hPa, and particularly compounds selected from mineral oils, natural oils, isoparaffins, polyisobutylenes, residues from the synthesis of alcohols by the oxo process, esters of low molecular mass synthetic carboxylic acids, fatty acid esters, such as octyl stearate and dodecyl palmitate, for example, fatty alcohols, ethers of low molecular mass alcohols, phthalates, esters of phosphoric acid, and waxes.

The compositions of the invention preferably contain water-insoluble organic compound (D) in amounts of 0 to 1000 parts by weight, more preferably 0 to 100 parts by weight, based in each case on 100 parts by weight of the total weight of components (A), (B) and, where used, (C).

The components used in the process of the invention may in each case comprise one kind of one such component or else a mixture of at least two kinds of each individual component. The compositions of the invention are preferably compositions which comprise
(A) at least one organosilicon compound of the formula (IV),
(B) at least one additive selected from
(B1) filler particles and/or
(B2) organopolysiloxane resin made up of units of the formula (II), optionally
(C) organosilicon compounds containing units of the formula (III), and optionally
(D) water-insoluble organic compounds.

The compositions of the invention are more preferably compositions which are composed of
(A) 100 parts by weight of an organosilicon compound of the formula (IV),
(B) 0.1 to 30 parts by weight of an additive selected from
(B1) filler particles and/or
(B2) organopolysiloxane resin made up of units of the formula (II), optionally
(C) organosilicon compounds containing units of the formula (III), and optionally
(D) water-insoluble organic compounds.

The compositions of the invention are preferably viscous, clear to opaque, colorless to brownish liquids, and preferably have a viscosity of 10 to 2,000,000 mPas, in particular of 2,000 to 50,000 mPas, in each case at 25° C. The compositions can be solutions, dispersions or powders.

The compositions of the invention can be prepared by any suitable method, such as by mixing of all the components, employing, for example, high shearing forces in colloid mills, dissolvers or rotor-stator homogenizers. This mixing operation may take place under reduced pressure in order to prevent the incorporation of air which is present, for example, in highly disperse fillers. Subsequently the fillers can be hydrophobicized in situ if required.

Where the compositions of the invention are emulsions it is possible to use all of the emulsifiers that are known to the skilled worker for the preparation of silicone emulsions, such as anionic, cationic or nonionic emulsifiers. Preference is given to using emulsifier mixtures, in which case these preferably include at least one nonionic emulsifier such as sorbitan fatty acid esters, ethoxylated sorbitan fatty acid esters, ethoxylated fatty acids, ethoxylated linear or branched alcohols having 10 to 20 carbon atoms and/or glycerol esters. In addition it is possible to add compounds known as thickeners, such as polyacrylic acid, polyacrylates, cellulose ethers such as carboxymethylcellulose and hydroxyethylcellulose, natural gums such as xanthan gum, and polyurethanes, and also preservatives and other customary adjuvants known to the skilled worker.

The continuous phase of the emulsions of the invention is preferably water. It is also possible, however, to prepare compositions of the invention in the form of emulsions wherein the continuous phase is formed by components (A), (B) and, where used, (C) or by component (D). The systems involved may also be multiple emulsions. Methods of preparing silicone emulsions are known. Normally the preparation takes place by simply stirring all of the constituents together and, where appropriate, subsequently homogenizing the system using jet dispersers, rotor-stator homogenizers, colloid mills or high-pressure homogenizers.

Where the composition of the invention comprises emulsions, oil-in-water emulsions containing 5% to 50% by weight of components (A) to (D), 1% to 20% by weight of emulsifiers and thickeners, and 30% to 94% by weight of water are preferred.

The compositions of the invention can also be formulated as free-flowing powders. These are preferred, for example, for use in powder detergents. The preparation of these powders starting from the mixture of components (A), (B), where used (C) and where used (D) takes place in accordance with methods that are known to the skilled worker, such as by spray drying or by agglomerated granulation, using adjuvants known to the skilled worker. The powders of the invention contain preferably 2% to 20% by weight of components (A) to (D). Examples of carriers employed include zeolites, sodium sulfate, cellulose derivatives, urea, and sugars. Further possible constituents of the powders of the invention include waxes, for example, or organic polymers, as described for example in EP-A 887097 and EP-A 1060778.

The present invention further provides detergents and cleaning products comprising the compositions of the invention.

The compositions of the invention can be used wherever compositions based on organosilicon compounds are useful. In particular they can be used as defoamers.

The present invention additionally provides a method of defoaming media and/or of preventing foam therein, which comprises adding the composition of the invention to the medium. The addition of the composition of the invention to the foaming media can take place directly, in dilution with suitable solvents such as toluene, xylene, methyl ethyl ketone or t-butanol, as a powder, or as an emulsion. The amount needed to obtain the desired defoamer effect is variable and depends for example on the nature of the medium, on the temperature and on the turbulence to be expected. Preferably the compositions of the invention are added in amounts of 0.1 ppm by weight to 1% by weight, in particular in amounts of 1 to 100 ppm by weight, based on the weight of the foaming medium.

The method of the invention is carried out at temperatures of preferably −10 to +150° C., more preferably 5 to 100° C., under the pressure of the surrounding atmosphere, i.e., about 900 to 1100 hPa. The method of the invention can also be carried out at higher or lower pressures, such as at 3000 to 4000 hPa or 1 to 10 hPa, for instance.

The defoamer compositions of the invention can be used, or the method of the invention carried out, wherever disruptive foam is to be prevented or destroyed. This is the case, for example, in nonaqueous media such as in tar distillation or in petroleum processing, and also in aqueous media. The defoamer compositions of the invention and the method of the invention are particularly suitable for controlling foam in aqueous media, such as in aqueous surfactant systems, for example, such as the use thereof in detergents and cleaning products, the control of foam in wastewater plants, in textile dyeing processes, in the scrubbing of natural gas, in polymer dispersions, or for defoaming aqueous media that are obtained in the production of cellulose.

The compositions of the invention have the advantage that as defoamers they can be easily handled and that they are distinguished by a high, long-lasting effectiveness in a wide variety of different media at low added amounts. This is extremely advantageous from both an economic and an environmental standpoint.

The compositions of the invention have the further advantage that they can also be used in media which are to be employed, for example, as coating materials or adhesives. The method of the invention has the advantage that it is easy to implement and highly economical.

In the examples below, all parts and percentages are by weight, unless indicated otherwise. Unless indicated otherwise, the examples below are carried out under the pressure of the surrounding atmosphere, i.e., at about 1000 hPa, and at room temperature, i.e., at about 20° C., or at a temperature which comes about when the reactants are combined at room temperature without additional heating or cooling. All of the viscosity figures quoted in the examples are at 25° C.

The text below uses the abbreviations Me for the methyl radical, CyP for cyclopentyl, NB for norbornyl, Oct for n-octyl, IOc for isooctyl, NeoH for neohexyl, Dd for dodecyl, and Hex for n-hexyl.

Tests of Defoamer Effectiveness

1. Antifoam Index AFI

In an apparatus in accordance with DE-A 25 51 260, 200 ml of a 4% strength by weight aqueous solution of a sodium alkylsulfonate (Mersolat™) containing 10 mg of the defoamer under investigation (in solution in 10 times the amount of methyl ethyl ketone) are foamed for 1 minute using two counterrotating stirrers. Subsequently the collapse of the foam is recorded. The area of the plot of foam height versus time is used to calculate the antifoam index. The lower this index, the more effective the defoamer.

2. Stirring Test 300 ml of a solution containing 1% by weight of a defoamer-free washing powder were foamed for 5 minutes with a stirrer at a speed of 1000 revolutions/min. Subsequently 100 μl of a 10% strength by weight solution of the defoamer in methyl ethyl ketone were added and stirring was continued for 25 minutes more. Throughout the time the foam height was recorded. As a measure of the effectiveness, the average foam height relative to the foam height without defoamer is calculated after 2-3 minutes. The lower the resulting figure, the more effective the defoamer.

3. Washing Machine Test 0.1 g of defoamer was added to 100 g of the defoamer-free washing powder. The washing powder was then introduced together with 3500 g of clean cotton laundry into a drum-type washing machine (Miele Novotronic W918 without Fuzzy Logic). Subsequently the wash program is started and the foam height is recorded over a period of 55 minutes. The foam scores (0 no foam measurable to 6 excessive foaming) determined throughout the period are used to determine the average foam score. The lower the score, the more effective the defoamer over the period as a whole.

Preparation of Organosilicon Compounds A1 to A6 and CA1 and CA2

A1: 132 g of a polysiloxane of formula
Me$_3$Si—O—[MeHSi—O—]$_{40}$[SiMe$_2$—O]$_{40}$—SiMe$_3$, the individual units distributed randomly in the molecule, are reacted with 100 g of norbornene in the presence of 9100 g of toluene and 1 g of platinum catalyst (Karstedt's platinum-1,3-divinyl-1,1,3,3-tetramethyldisiloxane complex containing 1% by weight platinum) at a temperature between 60 and 80° C. Removal of the volatile constituents from the reaction mixture provides 215 g of a clear oil having a viscosity of 18,800 mPas. According to $^{29}$Si NMR analysis this oil has the following structure:

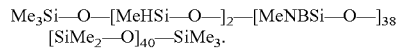

A2: 65 g of a polysiloxane of formula Me$_3$Si—O—[MeHSi—O—]$_{60}$—SiMe$_3$ are reacted in the presence of 0.5 g of platinum catalyst (Karstedt's platinum-1,3-divinyl-1,1,3,3-tetramethyldisiloxane complex containing 1% by weight platinum) at temperatures between 60 and 80° C., first with 22 g of cyclopentene and subsequently with 112 g of n-octene. Filtration and removal of the volatile constituents from the reaction mixture provides 140 g of a clear oil having a viscosity of 4250 mPas. According to $^{29}$Si NMR analysis this oil had the following structure:

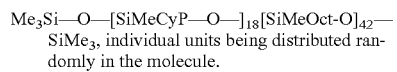

Analogous methods were used to prepare the organosilicon compound below, in each case with a relatively random distribution of individual units:

A3: Me$_3$Si—O—[SiMeDd-O—]$_{30}$[SiMeNeoH—O]$_{30}$—SiMe$_3$ (viscosity 737 mPas);

A4: CypMe$_2$Si—O—[SiMe$_2$—O—]$_{14}$[SiMeCyp-O]$_{17}$—SiMe$_2$CyP (viscosity 570 mPas);

A5: Me$_3$Si—O—[SiMeNB—O—]$_{12}$[SiMeIOc—O]$_{45}$[SiMeHex-O]$_3$—SiMe$_3$ (viscosity 18900 mPas);

A6: Me$_3$Si—O—[SiMeNB—O—]$_4$[SiMeOct-O]$_{16}$—SiMe$_3$ (viscosity 407 mPas);

CA1: Me$_3$Si—O—[SiMe$_2$—O—]$_{38}$[SiMeOct-O]$_{40}$—SiMe$_3$ (viscosity 464 mPas);

CA2: Me$_3$Si—O—[SiMeDd-O—]$_{30}$[SiMeHex-O]$_{30}$—SiMe$_3$ (viscosity 415 mPas);

EXAMPLES

Examples 1 to 6

The following components were used:

B11: pyrogenic silica having a BET surface area of 400 m$^2$/g, available commercially from Wacker-Chemie GmbH under the name HDK® T40.

B12: polydimethylsiloxane-pretreated silica having a BET surface area of 90 m$^2$/g and an average particle size of 5 μm (available commercially from Degussa AG, Germany under the name SIPERNAT® D10).

B2: silicone resin solid at room temperature and consisting of the following units (according to $^{29}$Si NMR and IR analysis): 40 mol % CH$_3$SiO$_{1/2}$, 50 mol % SiO$_{4/2}$, 8 mol % C$_2$H$_5$OSiO$_{3/2}$ and 2 mol % HOSiO$_{3/2}$. This resin had a weight-average molar mass of 7900 g/mol (relative to polystyrene standard).

C: a polydimethylsiloxane with α,ω-terminal alkoxy groups of the formula CH$_3$(CH$_2$)$_{19}$—O— and a viscosity of 100 mPas.

The components indicated in Table 1 are mixed with a dissolver, heated at 150° C. for 4 hours in the presence of 1500 ppm of KOH (as a 20% strength solution in methanol), cooled and then homogenized again with the dissolver.

TABLE 1

| | | | | |
|---|---|---|---|---|
| Examples 1 | 90 parts A1 | 5 parts B11 | 5 parts B2 | — |
| Examples 2 | 88 parts A2 | 6 parts B11 | 2 parts B2 | 4 parts C |

TABLE 1-continued

| Examples 3 | 90 parts A3 | 5 parts B11 | 5 parts B2 | — |
| Examples 4 | 90 parts A4 | 3 parts B11 and 2 parts B12 | 2 parts B2 | 3 parts C |
| Examples 5 | 92 parts A5 | 5 parts B11 | 3 parts B2 | — |
| Examples 6 | 90 parts A6 | 6 parts B12 | 4 parts B2 | — |

In all of the examples viscous, opaque mixtures are obtained which have the following viscosities:

Example 1: 105,000 mPas

Example 2: 50,400 mPas

Example 3: 6,400 mPas

Example 4: 3,200 mPas

Example 5: 72,000 mPas

Example 6: 2,160 mPas

The compositions thus obtained were then tested for the antifoam index AFI, by the stirring test and by the washing machine test. The results of these tests are summarized in Table 3.

Comparative Examples

C1: A defoamer base is prepared by mixing 2.5 parts of a condensation product having a viscosity of 180 mPas, prepared from octyldodecanol and a polydimethylsiloxane terminated with silanol groups and having a viscosity of 40 mPas, and 5 parts of a 50% strength toluenic solution of a silicone resin comprising 40 mol % trimethylsiloxy groups and 60 mol % $SiO_{4/2}$ groups, and then removing the volatile constituents.

A mixture of 89.3 parts by weight of a trimethylsiloxy-terminated polydimethylsiloxane having a viscosity of 1000 mPas at 25° C. (available from Wacker-Chemie GmbH, Germany under the name "Siliconöl AK 5000"), 5 parts by weight of the abovementioned defoamer base, 5 parts of hydrophilic pyrogenic silica having a BET surface area of 300 $m^2/g$ (available from Wacker-Chemie GmbH, Germany under the name HDK® T30) and 0.7 part by weight of a methanolic KOH is heated at 150° C. for 2 h. This gave an antifoam having a viscosity of 25,600 mPas.

C2: A branched polyorganosiloxane is prepared by the reaction of 378 g of a trimethylsiloxy-terminated polydimethylsiloxane having a viscosity of 1000 mPas at 25° C. (available from Wacker-Chemie GmbH, Germany under the name "Siliconöl AK 1000"), 180 g of a polydimethylsiloxane terminated with silanol groups and having a viscosity of 10,000 mPas at 25° C. (available from Wacker-Chemie GmbH, Germany under the name "Polymer FD 10"), and 18 g of ethyl silicate (available from Wacker-Chemie GmbH, Germany under the name "SILIKAT TES 40") in the presence of 0.3 g of KOH by heating at 140° C. Subsequently 30 g of a hydrophilic pyrogenic silica having a BET surface area of 200 $m^2/g$ (available from Wacker-Chemie GmbH, Germany under the name HDK® N20) and 30 g of a polydimethylsiloxane terminated with silanol groups and having a viscosity of 40 mPas are added and the mixture is heated at 180° C. for a further 4 h and freed from volatile constituents at 50 hPa. This gave a viscous, colorless defoamer formulation having a viscosity of 68,640 mPas.

C3 and C4 were prepared in the same way as for Examples 1 to 6. The reactants and the quantities in which they are employed are reported in Table 2.

TABLE 2

| Comparative Example 3 | 90 parts CA1 | 5 parts B11 | 5 parts B2 |
| Comparative Example 4 | 90 parts CA2 | 5 parts B11 | 5 parts B2 |

In the comparative examples, mixtures are obtained which have the following viscosities:

Comparative Example C3: 7200 mPas

Comparative Example C4: 2600 mPas

The compositions thus obtained were then investigated for the antifoam index AFI, in the stirring test and in the washing machine test. The results of these tests are summarized in Table 3.

| Example | Antifoam Index AFI | Stirring test average foam height in % | Washing machine test average foam score |
|---|---|---|---|
| C1 | 682 | 58 | 3.3 |
| C2 | 1612 | 75 | 4.4 |
| C3 | 52 | 71 | 4.8 |
| C4 | 187 | 39 | 3.7 |
| Example 1 | 697 | 55 | 0.7 |
| Example 2 | 227 | 37 | 0.2 |
| Example 3 | 52 | 41 | 1.2 |
| Example 4 | 67 | 38 | 1.1 |
| Example 5 | 375 | 37 | 1.0 |
| Example 6 | 77 | 31 | 0.8 |

In Comparative experiments C1 to C4 the wash liquor overflowed in the course of testing in the washing machine. The antifoams of Examples 1 to 6 show outstanding results in long-term action in the stirring test and in the washing machine.

Example 7

90 parts of $Me_3Si$—O—[SiMeNB—O—]$_4$[SiMeOct-O]$_{16}$—$SiMe_3$, the individual units distributed randomly in the molecule (viscosity 407 mPas), 5 parts of a pyrogenic silica having a BET surface area of 400 $m^2/g$ (available from Wacker-Chemie GmbH under the designation HDK® T40) and 5 parts of a silicone resin solid at room temperature and consisting of the following units (according to $^{29}Si$ NMR and IR analysis): 40 mol % $CH_3SiO_{1/2}$, 50 mol % $SiO_{4/2}$, 8 mol % $C_2H_5OSiO_{3/2}$ and 2 mol % $HOSiO_{3/2}$, with a weight-average molar mass of 7900 g/mol, are heated in the presence of 1500 ppm of KOH at 150° C. for 4 h.

This gives 100 parts of a defoamer formulation. This is mixed at 60° C. with 30 parts of sorbitan monostearate (available from Uniqema) and 20 parts of polyoxyethylene(20) sorbitan monostearates (available from Uniqema), and diluted gradually with 500 parts of water. 2 parts of a polyacrylic acid (available under the name "Carbopol™ 934" from BF Goodrich) are added to this mixture and mixed in, and a further 345 parts of water and 3 parts of an isothiazolinone-based preservative (available under the name "Acticide MV" from Thor-Chemie Speyer) are added. Subsequently the emulsion is homogenized at 100 bar using a high-pressure homogenizer and adjusted with 10% strength NaOH to a pH of 6-7. The defoamer emulsion obtained was outstandingly suitable for defoaming aqueous polymer dispersions. When used in emulsion paints, these polymer dispersions exhibit no flow defects.

Example 8

90 parts of $Me_3Si-O-[MeHSi-O-]_{40}[SiMe_2-O]_{40}-SiMe_3$, individual units distributed randomly in the molecule, 5 parts of a pyrogenic silica having a BET surface area of 400 m$^2$/g (available from Wacker-Chemie GmbH under the designation HDK® T40) and 5 parts of a silicone resin solid at room temperature and consisting of the following units (according to $^{29}$Si NMR and IR analysis): 40 mol % $CH_3SiO_{1/2}$, 50 mol % $SiO_{4/2}$, 8 mol % $C_2H_5OSiO_{3/2}$ and 2 mol % $HOSiO_{3/2}$, with a weight-average molar mass of 7900 g/mol, are heated in the presence of 1500 ppm of KOH at 150° C. for 4 h.

35 ml of a 2% solution of a high molecular weight copolymer of acrylic acid, methacryloyl stearate and pentaerythritol diallyl ether (in a 100:2:0.3 ratio) which, when neutralized, has a viscosity of 17,500 mm$^2$/s, were charged to a glass beaker and, with intensive mixing using a paddle stirrer, 10 g of the abovementioned defoamer formulation were slowly added, so that after 10 minutes' stirring there was an emulsion of the defoamer formulation in the polymer solution. With continued stirring, 88.5 g of light soda were added to this emulsion and subsequently the water was removed under vacuum with continued mixing. Thereafter 0.5 g of a hydrophilic silica having a BET surface area of 200 m$^2$/g (available from Wacker-Chemie GmbH under the name HDK® N20) was mixed in.

This gave a white, free-flowing powder. This powder was used successfully for preventing foam in pulverulent detergents or in pulverulent crop protection concentrates.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A defoamer composition comprising:
   (A) at least one organosilicon compound comprising units of the formula $$R_a(R^1O)_bR^2_cSiO_{(4-a-b-c)/2} \tag{I}$$

in which
   R each, independently denotes hydrogen or a monovalent, optionally substituted, SiC-bonded linear aliphatic hydrocarbon radical,
   $R^1$ each, independently denotes hydrogen or a monovalent, optionally substituted hydrocarbon radical,
   $R^2$ each, independently denotes a monovalent, SiC-bonded, optionally substituted, aliphatic cyclic or aliphatic branched hydrocarbon radical having at least 3 carbon atoms,
   a is 0, 1, 2 or 3,
   b is 0, 1, 2 or 3,
   c is 0, 1 or 2
   with the proviso that the sum a+b+c≦3, the organosilicon compound has at least one unit of the formula (I) with c other than 0, and in at least 50% of all of the units of the formula (I) in the organosilicon compound the sum a+b+c is 2;
   (B) at least one additive (B1) and/or (B2):
   (B1) filler particles,
   (B2) organopolysiloxane resin(s) comprising units of the formula $$R^3_d(R^4O)_eSiO_{(4-d-e)/2} \tag{II}$$

in which
   $R^3$ each, independently denotes hydrogen or a monovalent, optionally substituted, SiC-bonded hydrocarbon radical,
   $R^4$ each, independently denotes hydrogen or a monovalent, optionally substituted hydrocarbon radical
   d is 0, 1, 2 or 3 and
   e is 0, 1, 2 or 3,
   with the proviso that the sum d+e≦3 and in less than 50% of all of the units of the formula (II) in the organopolysiloxane resin the sum d+e is 2, and
   (C) optionally, one ore more organosilicon compound(s) comprising units of the formula $$R^5_g(R^6O)_hSiO_{(4-g-h)/2} \tag{III}$$

in which
   $R^5$ each, independently denotes hydrogen or a monovalent, optionally substituted, SiC-bonded aromatic or linear aliphatic hydrocarbon radical,
   $R^6$ each, independently denotes hydrogen or a monovalent, optionally substituted hydrocarbon radical,
   g is 0,1, 2 or 3 and
   h is 0, 1, 2 or 3,
   with the proviso that the sum g+h≦3 and in at least 50% of all of the units of the formula (III) in the organosilicon compound the sum g+h is 2.

2. The composition of claim 1, wherein at least one $R^2$ comprises a cycloaliphatic hydrocarbon radical.

3. The composition of claim 2, wherein the mol percentage of radicals $R^2$ in component (A) is 5% to 100%, based on the total number of SiC-bonded radicals.

4. The composition of claim 2, wherein component (A) comprises substantially linear organopolysiloxanes of the formula $$R^2_fR_{3-f}Si-O-[SiR_2-O-]_x[SiRR^2-O]_y-SiR_{3-f}R^2_f \tag{IV}$$

where f each, independently is 0 or 1, x is 0 or a positive integer, y is an integer greater than or equal to 1 and the x units [SiR$_2$—O] and the y units [SiRR$^2$—O] are present in any distribution in the molecule.

5. The composition of claim 2, wherein component (B2) is present, and comprises one or more silicone resins comprising units of the formula (II) for which in less than 30% of the units in the resin the sum d+e is 2.

6. The composition of claim 1, wherein substantially all $R^2$ comprise identical or different cycloaliphatic hydrocarbon radicals.

7. The composition of claim 6, wherein the mol percentage of radicals R$_2$ in component (A) is 5% to 100%, based on the total number of SiC-bonded radicals.

8. The composition of claim 6, wherein component (A) comprises substantially linear organopolysiloxanes of the formula $$R^2_fR_{3-f}Si-O-[SiR_2-O-]_x[SiRR^2-O]_y-SiR_{3-f}R^2_f \tag{IV}$$

where f each, independently is 0 or 1, x is 0 or a positive integer, y is an integer greater than or equal to 1 and the x units [SiR$_2$—O] and the y units [SiRR$_2$—O] are present in any distribution in the molecule.

9. The composition of claim 6, wherein component (B2) is present, and comprises one or more silicone resins comprising units of the formula (II) for which in less than 30% of the units in the resin the sum d+e is 2.

10. The composition of claim 1, wherein the mol percentage of radicals $R^2$ in component (A) is 5% to 100%, based on the total number of SiC-bonded radicals.

11. The composition of claim 10, wherein component (A) comprises substantially linear organopolysiloxanes of the formula

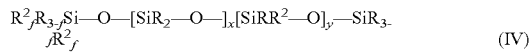  (IV)

where f each, independently is 0 or 1, x is 0 or a positive integer, y is an integer greater than or equal to 1 and the x units [SiR$_2$—O] and the y units [SiRR$^2$—O] are present in any distribution in the molecule.

12. The composition of claim 10, wherein component (B2) is present, and comprises one or more silicone resins comprising units of the formula (II) for which in less than 30% of the units in the resin the sum d+e is 2.

13. The composition of claim 1, wherein component (A) comprises substantially linear organopolysiloxanes of the formula

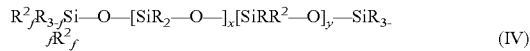  (IV)

where f each, independently is 0 or 1, x is 0 or a positive integer, y is an integer greater than or equal to 1 and the x units [SiR$_2$—O] and the y units [SiRR$^2$—O] are present in any distribution in the molecule.

14. The composition of claim 13, wherein component (B2) is present, and comprises one or more silicone resins comprising units of the formula (II) for which in less than 30% of the units in the resin the sum d+e is 2.

15. The composition of claim 13, comprising
(A) at least one organosilicon compound of the formula (IV),
(B) at least one additive selected from
    (B1) filler particles and/or
    (B2) organopolysiloxane resin(s) comprising units of the formula (II), optionally
(C) organosilicon compounds containing units of the formula (III), and
(D) at least one water-insoluble organic compound.

16. A method of defoaming a liquid medium and/or preventing foam therein, comprising adding to said medium at least one defoamer composition of claim 1.

17. The method of claim 16, wherein the composition is added in an amount of from 0.1 ppm by weight to 1% by weight based on the weight of the medium.

18. A composition of claim 1, wherein component (B1) comprises one or more pulverulent fillers.

19. The composition of claim 1, wherein component (B2) is present, and comprises one or more silicone resins comprising units of the formula (II) for which in less than 30% of the units in the resin the sum d+e is 2.

20. In a detergent composition wherein a defoamer is included, the improvement comprising selecting as at least one defoamer, a defoamer composition of claim 1.

21. The composition of claim 1, wherein filler particles (B1) are present, and comprise a hydrophilic filler.

22. The composition of claim 1, wherein filler particles (B1) are present, and comprise a hydrophilic filler which is hydrophobicized in situ when preparing the composition.

23. The composition of claim 1, wherein at least a portion of the groups $R^2$ are selected from the group consisting of cyclopentyl, cyclohexyl, norbornyl, cyclooctyl, branched aliphatic hydrocarbon radicals having 5 to 10 carbon atoms, and mixtures thereof.

* * * * *

UNITED STATES PATENT AND TRADEMARK OFFICE
CERTIFICATE OF CORRECTION

| | | |
|---|---|---|
| PATENT NO. | : 7,550,514 B2 | Page 1 of 1 |
| APPLICATION NO. | : 11/176617 | |
| DATED | : June 23, 2009 | |
| INVENTOR(S) | : Holger Rautschek et al. | |

It is certified that error appears in the above-identified patent and that said Letters Patent is hereby corrected as shown below:

Column 16, Line 54, Claim 6:

Delete "$R_2$" and insert -- $R^2$ --.

Signed and Sealed this

Twenty-fifth Day of August, 2009

David J. Kappos
*Director of the United States Patent and Trademark Office*